Aug. 28, 1945. J. HIRSHSTEIN 2,383,481
CHECK VALVE
Filed Nov. 26, 1943 2 Sheets-Sheet 1

INVENTOR.
JOSEPH HIRSHSTEIN.
BY Fay, Gdrick, Chilton & Isler.
Attorneys.

Aug. 28, 1945.  J. HIRSHSTEIN  2,383,481
CHECK VALVE
Filed Nov. 26, 1943  2 Sheets-Sheet 2
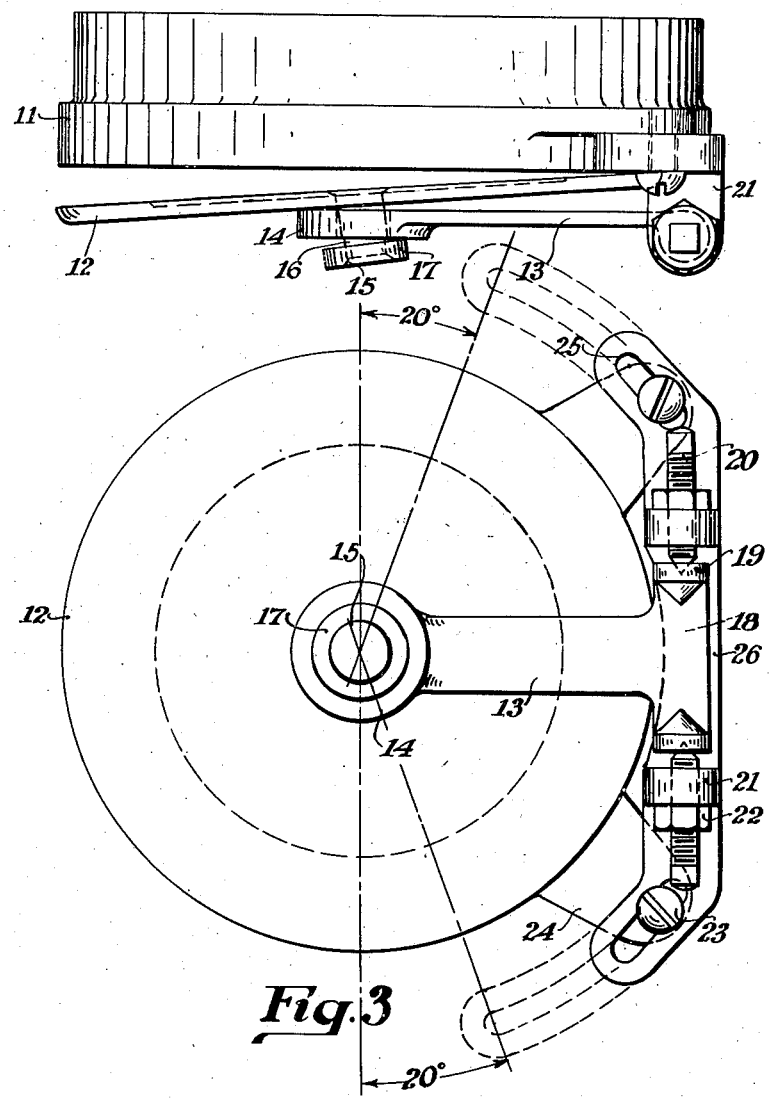
INVENTOR.
JOSEPH HIRSHSTEIN.

Patented Aug. 28, 1945

2,383,481

UNITED STATES PATENT OFFICE 2,383,481

CHECK VALVE

Joseph Hirshstein, Cleveland, Ohio, assignor of one-half to Ruth R. Newman and one-half to Mildred Hirshstein, both of Cleveland, Ohio Application November 26, 1943, Serial No. 511,807

4 Claims. (Cl. 251—123)

This invention relates to a flood water check valve of the pivoted swing-disk type generally utilizable for the control of back flow in a drain line, a sewer line or the like, where there is danger of back water surging into the line during main sewer flood periods.

Valve structures for such purposes usually have a metal body provided with sewer line connection branches whereby the valve body becomes part of the sewer line. The specific valve elements are usually made of a non-corrosive metal such as brass or bronze, and the swinging valve member is supported by a pivot means having a horizontally disposed axis located above the sewer line passageway. Such structures are comparatively bulky and heavy, thus making it difficult to install the mechanism with such degree of leveling precision as is required in the obtaining of the most efficient sensitivity factor of the movable valve parts.

Also the swinging member of both the normally seated and normally unseated type has a marked tendency to direct the outflowing sewage water and debris therein in a downward direction. Under sluggish flow conditions the danger of debris, such as paper, becoming snagged or partly suspended on the lower part of the valve precision face is always present. Should a sudden back-flow occur the swinging valve member is thus prevented from checking the flood condition. A downwardly disposed offset in the valve body has been provided heretofore of, for example, one and a half inch in a five-inch valve, in an effort to overcome this fouling condition, but this introduced the disadvantage of limiting the use of such a valve mechanism in sewer lines of slight drainage slope.

My invention is concerned particularly with the provision of a side swing disk valve which is normally open or unseated so as to allow flowing action of water to act normally as a flush in maintaining the valve seat free of debris and solids in the discharge direction, but which will become shut under the pressure of slight back water influence. Should it be desired, the valve supporting means can be disposed so that the valve member will be in a sensitively adjusted normally closed position.

An object of the present invention is to provide an adjustable mounting for a side swing valve disk that will impart to the latter a particular sensitivity against pressure differential so that the valve will respond to the slightest outflow and back pressure with utmost accuracy and the adjustable characteristic will permit of adjustment after the valve body has been permanently connected into a line.

In valves hitherto used for piping systems of this type a construction of a normally unseated valve check member affording a double pivotal suspension for said member was used which, through being sensitive, required a substantial downward offset and also installation technique under a variety of sewer line environments and conditions, some of which, when met, brought about faulty installation and consequent defective functioning of the valve mechanism. It is an object of the present invention to provide a locally adjustable side-swing valve disk supporting means which will require less sewer line offset, though simple in construction, and which can be set or adjusted after the valve body has been installed on the sewer line and regardless of inaccuracies of the bulky valve body disposition in the sewer line.

For achieving this purpose adjustable means can be provided which will cause a slight displacement of one end of the member that supports the valve disk with respect to the valve seat or be originally formed on a bias for offsetting the swinging axis of the valve disk to a certain extent. Furthermore, to make an added off-setting of the swinging axis available, the member, which serves for suspending the swinging disk, is made adjustable in an annular direction relative to the center line of the valve body or sewer line in which the body is installed so that such axial displacement will also influence the sensitive swinging action of the disk.

Other objects will become apparent as the description proceeds with reference to the accompanying drawings.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various forms in which the principle of the invention may be used.

In said annexed drawings—

Fig. 2 is a top view of the valve mechanism; and

Fig. 3 is a front elevation of the swing member and the mounting therefor.

Fig. 1 illustrates a valve according to my invention with the body thereof adapted to be installed in a pipe line; A is the inlet branch, B the outlet branch and C is an inspection and access cover.

Figure 1:
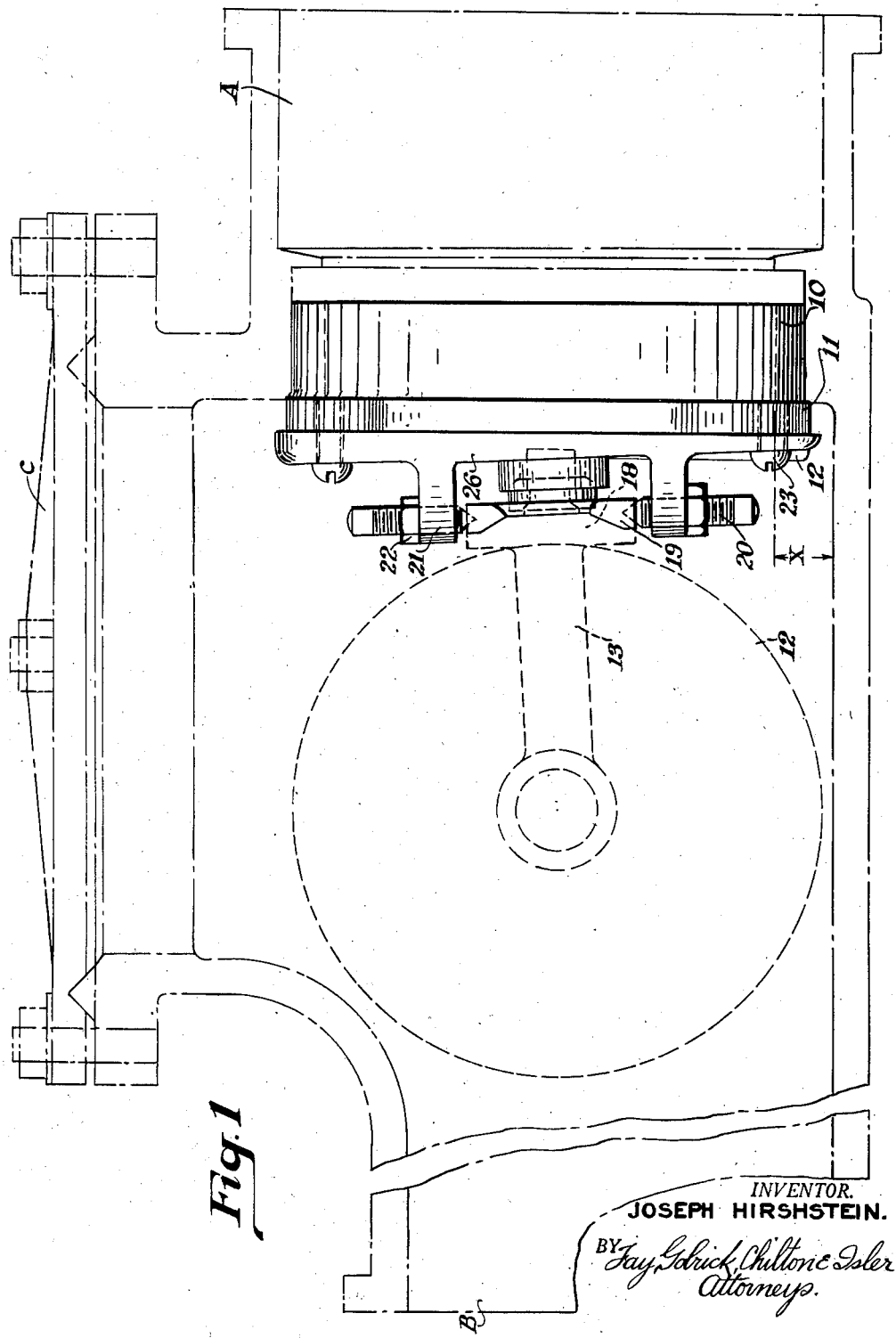
Fig. 1 shows an elevational cross-section of the valve body according to the invention, and with the swing member of the valve illustrated in its normal position as drawn in solid lines and in the extreme open position as drawn in dotted lines.

The inlet structure includes a valve seat member 10 that terminates in a flanged part 11 and which forms the valve seat proper and which also serves as a support for the mounting of a disk 12, the latter being the swing member of the check valve. Disk 12 is loosely supported by an arm 13 in a hub-shaped end 14 thereof. A stubshaft or lug 16, integrally formed on disk 12, or screwed thereto, is loosely fitted in said hub and held therein by an annulus 17 over which the shaft 16 is peened as shown at 15. The loose connection between the disk and its supporting arm makes it possible for the disk to adjust itself on the seat to proper seating position in spite of the displacement of the mounting described hereinafter. This loose connection also permits the disk to turn slightly during the course of the existence of its usefulness and in a well known manner.

The other end of arm 13 is T-shaped, the two ends 18 of the T-bar being provided with bosses 19 for pivotally suspending arm 13. These bosses have conical sockets formed therein which are in engagement with the ends of screw bolts 20, forming a trunnion bearing therefor. The bolts are carried in threaded lugs 21 and locked in a desired position by nuts 22. The lugs 21 project at right angles from a yoke-shaped member 26 fitted to the side of flange 11 and secured thereon by means of screws 23 passed through slots 25 in said yoke and engaging with ears 24 formed integrally with flange 11.

In order to increase the sensitivity of the swing member 12 to differential of pressure I provide means slightly to displace the yoke 26 at one end thereof, as shown in Fig. 1. To this end, the plane of the face of yoke 26 is arranged at an angle or in non-parallel relation to the pivotal axis of the swinging valve member as shown. If desired, the yoke 26 may be wedge shaped. The other way to bring about the angular relation is to make the distance of the upper pivot bearing from the yoke member 26 larger than the distance of the lower bearing from said yoke. The small angle thus obtained offsets the swinging axis and tends to reopen the valve after it has been closed by back water pressure, as soon as this pressure is relieved.

With customary constructions, such opening upon relief of pressure is not reliable, because the valve disk, once seated, has a tendency to remain in that position until a comparatively large pressure from the inlet side pushes it open. With the means above indicated I am able to overcome any such inertia tendency of the valve member to lag as soon as the pressure at the outlet side is normal again. If it is desired to further offset the swinging axis of the disk 12 this can be done by loosening bolts 23 and annularly displacing the yoke bar 26 by shifting it to the left or right before locking it again by a tightening of the bolts.

It has already been mentioned that in some cases it may be desirable to have a normally closed valve member, while in other cases a normally open valve member is preferable. The construction according to the invention makes both arrangements possible as the conditions may require. The change from a normally open to a normally closed position of the swing valve member is brought about by adjustment of the yoke bar 26 mentioned in the preceding paragraph, said adjustment being made along an arc following the contour of the valve seat. If such is desired the slots 25 provided at both ends of yoke 26 should be sufficiently long to allow of a total arcuate shifting of about 40° which is sufficient for the alternate purpose stated.

By thus providing the above mentioned locally adjustable means for slightly off-setting the swinging axis of the valve disk I am able to considerably increase the sensitivity of the disk against pressure differential and thereby to render the valve mechanism very reliable in operation regardless of any inaccuracies which may occur in the unlevel or mis-aligned disposition of the bulky valve body in the sewer line at the time of its installation.

It will be noted in Fig. 1 that the downward offset indicated by the dimension line $x$ has been reduced to a relative minimum as compared to the valve body structure disclosed in my Patent 1,635,842, issued July 12, 1927. In the example mentioned above of a five-inch valve the offset has been cut down to ¾ of an inch. This is due to the fact that the side swing action of the valve member directs the flow of the debris-laden discharging water upwardly when passing over the seating surface instead of at the bottom and the tendency of the discharging water to press debris, such as paper, against the seat, is overcome.

The flowing action of the sewerage water through the valve port is improved considerably in so far as the prevention of the snagging or sticking of debris to the valve seat is concerned and sensitivity is greatly increased, all in a manner within the realm of practical and economical manufacture. The apparatus is installable in sewer lines of meagre slope to advantage.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a sewer line check valve mechanism, a seat member, a yoke carried on said member for mounting a valve disk, a valve disk mounted on said yoke in normally open position with respect to said seat and adapted to be closed by the impact of back water, a supporting arm having one hub-shaped end for the mounting of said disk therein and having its other end T-shaped with a boss at each end of said T-shaped end for pivotally connecting said arm to said yoke, said yoke having a wedge-shaped face adjacent said valve seat for offsetting one end of the yoke with respect to the valve seat member whereby the disk is caused to return by gravity to open position as soon as the excessive back pressure is relieved.

2. In a sewer line check valve mechanism, a valve body comprising a vertically disposed seat member, lugs on said seat member for adjustably attaching a yoke thereto, a valve disk mounted on said yoke in normally open position with respect to the seat and adapted to be closed by the impact of back water, means on said yoke for pivotally mounting said disk, a stub shaft integrally formed at the center of said disk, a supporting arm for said disk with one end of said arm being hub-shaped so as to loosely receive said stub shaft, and with the other end T-shaped, a boss on each of the lateral ends of said T-shaped end for engagement with said pivot means on said yoke, and a wedge-shaped face on said yoke for unilaterally upsetting the yoke with respect to the valve seat member, whereby the disk is caused to return by gravity to open position as soon as the excessive back pressure is relieved.

3. In a sewer line check valve mechanism, a seat member, a yoke carried on said member for mounting a valve disk, a valve disk mounted on said yoke in normally open position with respect to said seat and adapted to be closed by the impact of back water, a supporting arm having hubbed end formations comprising a single end formation at one end for the mounting of said disk therein and a double hub formation at the outer end, each of these hubs in the double hub being adapted for pivotally connecting said arm to said yoke, said yoke having a wedge-shaped face adjacent said valve seat for offsetting one end of the yoke with respect to the valve seat member whereby the disk is caused to return by gravity to open position as soon as the excessive back pressure is relieved.

4. In a sewer line check valve mechanism, a valve body comprising a vertically disposed seat member, lugs on said seat member for adjustably attaching a yoke thereto, a valve disk mounted on said yoke in normally open position with respect to the seat and adapted to be closed by the impact of back water, means on said yoke for pivotally mounting said disk, a stub shaft integrally formed at the center of said disk, a supporting arm for said disk with one end of said arm being hub-shaped so as to loosely receive said stub shaft, and with the other end having a double hub formation with the two hubs engaging said pivot means on said yoke, and a wedge-shaped face on said yoke for unilaterally upsetting the yoke with respect to the valve seat member, whereby the disk is caused to return by gravity to open position as soon as the excessive back pressure is relieved.

JOSEPH HIRSHSTEIN.